(12) United States Patent
Forman et al.

(10) Patent No.: US 7,379,934 B1
(45) Date of Patent: *May 27, 2008

(54) DATA MAPPING

(76) Inventors: Ernest Forman, 1438 Ironwood Dr., McLean, VA (US) 22101; Alexander Vladimir Norko, 14510 Creek branch Ct., Centreville, VA (US) 20120; Anatoly S. Shvartsman, 883 Kennebec St., Pittsburgh, PA (US) 15217

( * ) Notice: Subject to any disclaimer, the term of this patent is extended or adjusted under 35 U.S.C. 154(b) by 238 days.

This patent is subject to a terminal disclaimer.

(21) Appl. No.: 11/176,294

(22) Filed: Jul. 8, 2005

Related U.S. Application Data

(60) Provisional application No. 60/586,407, filed on Jul. 9, 2004.

(51) Int. Cl.
*G06F 17/30* (2006.01)
(52) U.S. Cl. .......................... 707/4; 719/313
(58) Field of Classification Search ............... 707/4; 705/7; 719/313
See application file for complete search history.

(56) References Cited

U.S. PATENT DOCUMENTS

| | | | | |
|---|---|---|---|---|
| 5,966,531 A | * | 10/1999 | Skeen et al. | 719/315 |
| 6,850,891 B1 | * | 2/2005 | Forman | 705/7 |
| 6,910,216 B2 | * | 6/2005 | Abileah et al. | 719/319 |
| 6,954,932 B2 | * | 10/2005 | Nakamura et al. | 719/313 |

* cited by examiner

*Primary Examiner*—Charles Rones
*Assistant Examiner*—Noosha Arjomandi
(74) *Attorney, Agent, or Firm*—David G. Grossman; David Yee

(57) ABSTRACT

The present invention provides for data to be bilaterally transferred between general applications such as databases and task specific applications. The transfer maps and transports data between applications. The first application includes a data structure with a data structure identifier and a table. The second application includes a data grid. The mapping of data is performed by: associating a column in the grid to a table data field; associating a mapping icon with the column; and associating the table identifier with the column. The transporting of data between the applications include: identifying a transport function; identifying at least one of the mapping; and transporting data according to the selected mapping and the selected transport function.

6 Claims, 5 Drawing Sheets

DATA MAPPING

CROSS-REFERENCE TO RELATED APPLICATIONS

This application claims the benefit of U.S. Provisional Application No. 60/586,407, filed Jul. 9, 2004, entitled "Data Mapping," which is hereby incorporated by reference in its entirety.

BACKGROUND OF THE INVENTION

The present invention relates to the transfer of data between software applications. More specifically, the present invention provides for data to be transferred between general applications such as databases and task specific applications such as decision support software.

The overhead associated with manually entering data into applications may be inefficient and error prone, especially when that data has already been entered in a different application. Writing specific data transfer utilities may also be inefficient because of the custom programming resources required. What is needed is a generalized method to allow general users of an application to efficiently set up repeatable data transfers between applications.

BRIEF SUMMARY OF THE INVENTION

One advantage of the present invention is that it enables a typical software user without extensive programming experience the capability of setting up and executing data transfers between software applications.

Another advantage of this invention is it allows users of multiple software applications to utilized data already entered in different software applications.

A further advantage of this invention enables repeatability of data transfers among a group of users.

Yet a further advantage of this invention is that it minimizes data entry errors by enabling more accurate data entry into software applications.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

DETAILED DESCRIPTION OF THE INVENTION

Figure 1:
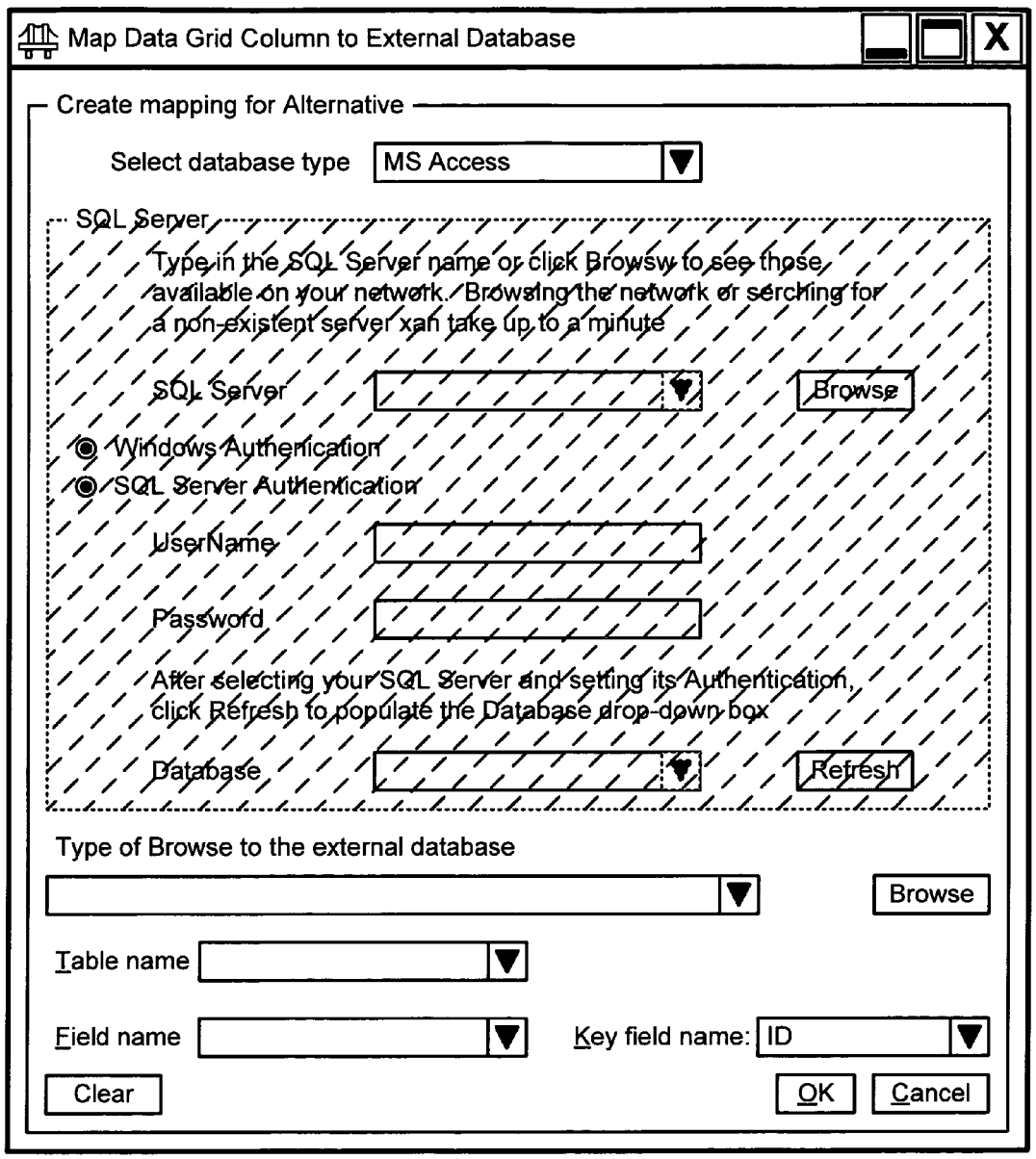
FIG. 1 shows an example screenshot of an embodiment of an aspect of the present invention where mapping specifications or parameters may be entered into an application.

Throughout this description, the preferred embodiment and examples shown should be considered as exemplars, rather than as limitations on the present invention.

The present invention provides a unique mechanism to pass data contained in data structures between software applications such as general and specific software applications. This mechanism may be stored on tangible computer readable media as one or more computer programs and capable of being executed by one or more processors. General software applications include database and spreadsheets applications (such as Access & SQL Server). Specific software applications are generally directed to solve specific tasks. One example of a specific application where the present invention may be utilized is generic decision support software such as Expert Choice 11 by Expert Choice Inc. of Arlington Va. General applications are widely used because of their ease in performing user specific analysis and their ability to store data in standard and accessible formats. However, some tasks are too complicated for an average user to implement using a general program. Experts at solving these specific tasks often write specialized programs to help users perform these tasks. As a practical matter, users often wish to import and export data between these specific and general applications.

The present invention solves the problem of importing and exporting data between software applications. Specifically, an embodiment of this invention will be described with reference to the decision support software by Expert Choice Inc. Therefore, a general description of that application will be described to further the readers understanding of the present invention.

Many decisions are too complex or too important for decision-makers to make choices based solely on instinct. For example, today's typical budget decision involves a variety of tangible and intangible strategic goals, conflicting stakeholders (each grasping for their piece of the budget), dozens or hundreds of alternative initiatives to be pursued, and limited resources. No single decision-maker can meaningfully combine all of this information and make informed decisions. Decision support software makes possible the synthesis of input from multiple stakeholders and provides the necessary capability to analyze, prioritize and communicate those decisions.

Based on the Analytic Hierarchy Process (AHP), the Expert Choice decision support software provides a mathematically rigorous application and proven process for prioritization and decision-making. By reducing complex decisions to a series of pairwise comparisons, the software may synthesize results that not only helps decision-makers arrive at the best decision, but also provides a clear rationale for the decision.

While traditional management processes and collaboration tools employ good information gathering methods— such as brainstorming sessions and surveys, they provide no accurate or thorough way to bring information together. Decision support software provides decision makers with a process for synthesizing data and developing priorities in an easy to use application that does not require an advanced degree in decision science to implement.

FIG. 1 shows an example data entry screenshot used to specify how data in a Data Grid Column may be mapped with or to/from an external database. Expert Choice's data grid displays Analytic Hierarchy Process (AHP) data, formulas, and calculated values. Data may be entered into a data grid either manually or automatically exported and imported between the data grid and external databases. Each data grid column may be mapped to a specified field in a specified database. All or part of the data grid data may be imported or exported at the same time. A data grid column must first be mapped to an external database and then the data transferred between the datagrid columns and the external databases.

A Data Grid lists all alternatives in a decision model. Alternative choices may be selected for extraction to an Alternatives pane of a model view. The Data Grid may also used to evaluate alternatives with respect to covering objectives in a model using one of several different formulas such as: Ratings, Step function, Increasing or Decreasing utility curves, and Direct entry of priorities.

Figure 2:
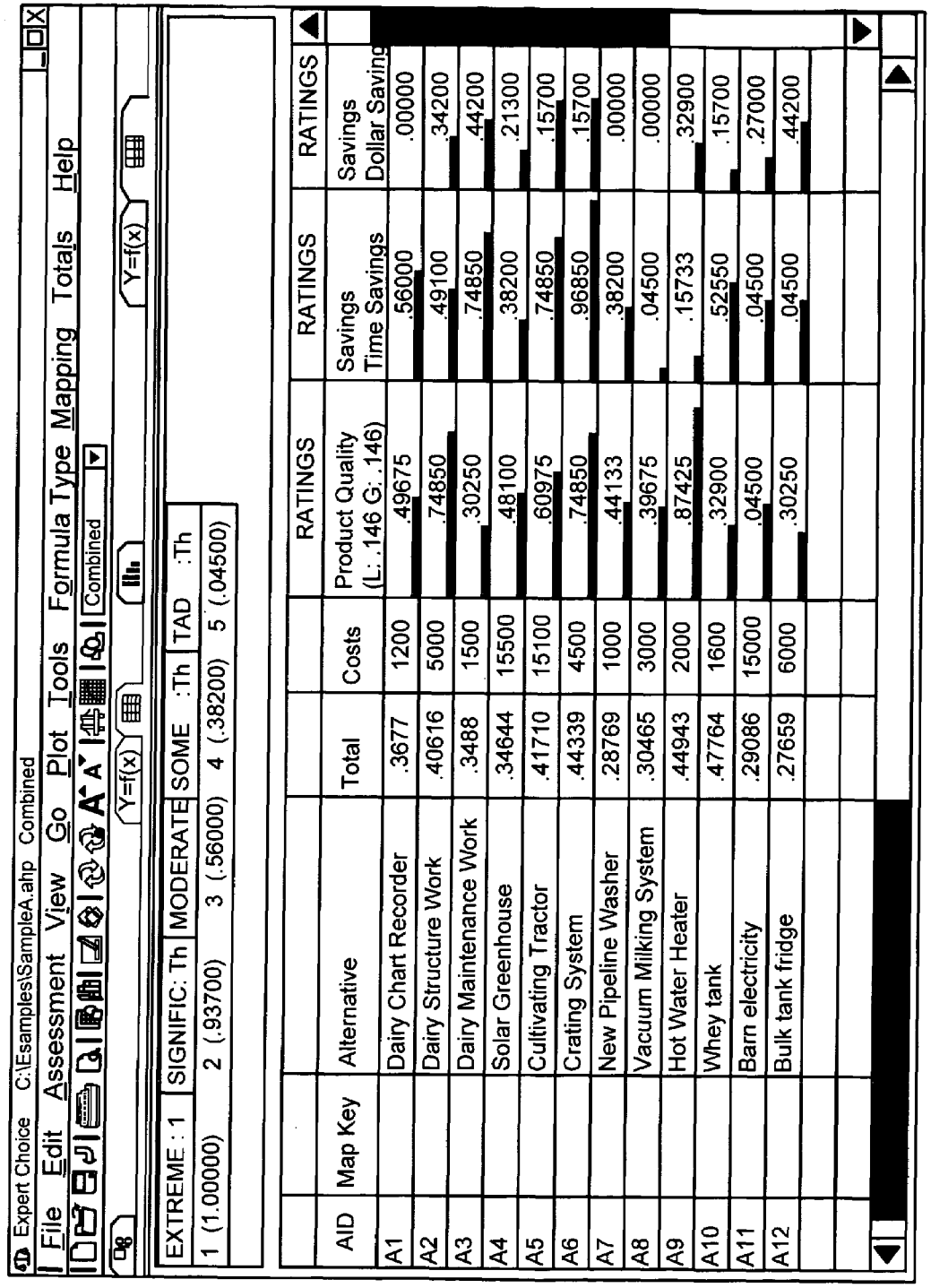
FIG. 2 shows an example screenshot of a data grid per an embodiment of an aspect of the present invention.

FIG. 2 shows an example screenshot of a data grid per an embodiment of an aspect of the present invention. The Data Grid may contain data about decision alternatives with respect to covering objectives of a decision hierarchy. The alternatives preferably appear in rows of the Data Grid while the covering objectives preferably appear in the columns. Instead of deriving priorities for alternatives through pairwise comparisons, one may define a formula under any covering objective (column). Each covering objective's formula may convert data about the alternatives to values (priorities).

Alternatives that are added to a model from an Alternatives pane in the ModelView may be known as active alternatives and may be automatically added to the Data Grid. Alternatives may also be added directly in the Data Grid. All the alternatives in the Data Grid may be referred to as global alternatives.

Active alternatives are preferably check-marked in the grid. One may mark or un-mark active alternatives and may then extract them to the Alternatives pane to refine judgments or perform sensitivity analyses.

The AID (Alternative Id) column contains unique keys for the alternatives and preferably shows the order in which the alternatives were entered into the model. (The display of AID's may be turned off and on with the Tools, Options, View command by selecting the appropriate button in Data and Formulas Grids pane.)

As shown, the Data Grid also has 'Total' and 'Cost' columns, which may be made visible or hidden using a Data Grid View menu command. The value in the total column for each alternative preferably contains the weighted sum of the values (priorities) for the alternative across all the covering objectives' columns.

Each cell in the body of the Data Grid preferably contains: (1) a bar representing the value of the respective alternative (row element) with respect to the covering objective (column element); and (2) the underlying data or value (you can ask to see either data or values by selecting the View menu). Generally, a group model's combined instance will only show the average of the combined values rather than the data.

The values in the Data Grid body cells may be derived from the data based on one of several formula types such as: ratings, increasing utility curve; decreasing utility curve; step function; and direct entry of priorities.

Setting up a mapping to perform an export and/or import of data with a database will now be described. This process may be used to map Data Grid column(s) to external database(s). One may map alternatives, costs, covering objectives and user defined columns. Before a covering objective may be mapped, a formula type should be defined. Once columns are mapped, data may be imported or exported between this application and an external database. Specifically, in this embodiment, the Alternative Name Column may be mapped to an External Database using the following steps:

1. Click on any cell in the Alternative column in the Data Grid.
2. Select Mapping|Add/Change Mapping of Selected Column to External Database. (Alternatively, one may right-click on the Heading of the Alternative Column and select the same command causing the "Map Data Grid Column to External Database" form to display (see FIG. 1).
3. Specify the mapping information as follows:
    a. Identify the type of the database that will be mapped to. (For example: Access or SQL Server).
    b. Identify the External Database to be mapped.
    c. Identify the Table Name that contains or will contain the alternatives.
    d. Identify the Field Name of the alternatives in the table.
    e. Identify the Key Field that will be used to uniquely identify the alternatives in this table.
    f. Click OK to finish the mapping.
4. A bridge button will may then appear in the alternative column header (see FIG. 2). If this is the first mapped column in the grid then the Map Key column (see FIG. 2) will preferably be displayed to the left of the alternative column. (One may show or hide the Map Key column using the Data Grid's View menu. The Map Key used by Expert Choice is a unique identifier that associates an alternative with a record in a table in an external database.)

In addition, in this embodiment, the other columns may be mapped in the data grid by creating mappings for other columns. However, mappings for covering objectives may only be made if there is a formula type defined for a covering objective. Once a column is mapped, one may import or export data between an external database and the data grid.

Other mapping options may include changing or deleting previously defined mappings. This may be done by first moving to the column that will have its mapping changed or deleted; second, selecting a mapping from the menu (or right-click on the bridge button of the column); and third, selecting an option.

Figure 3:
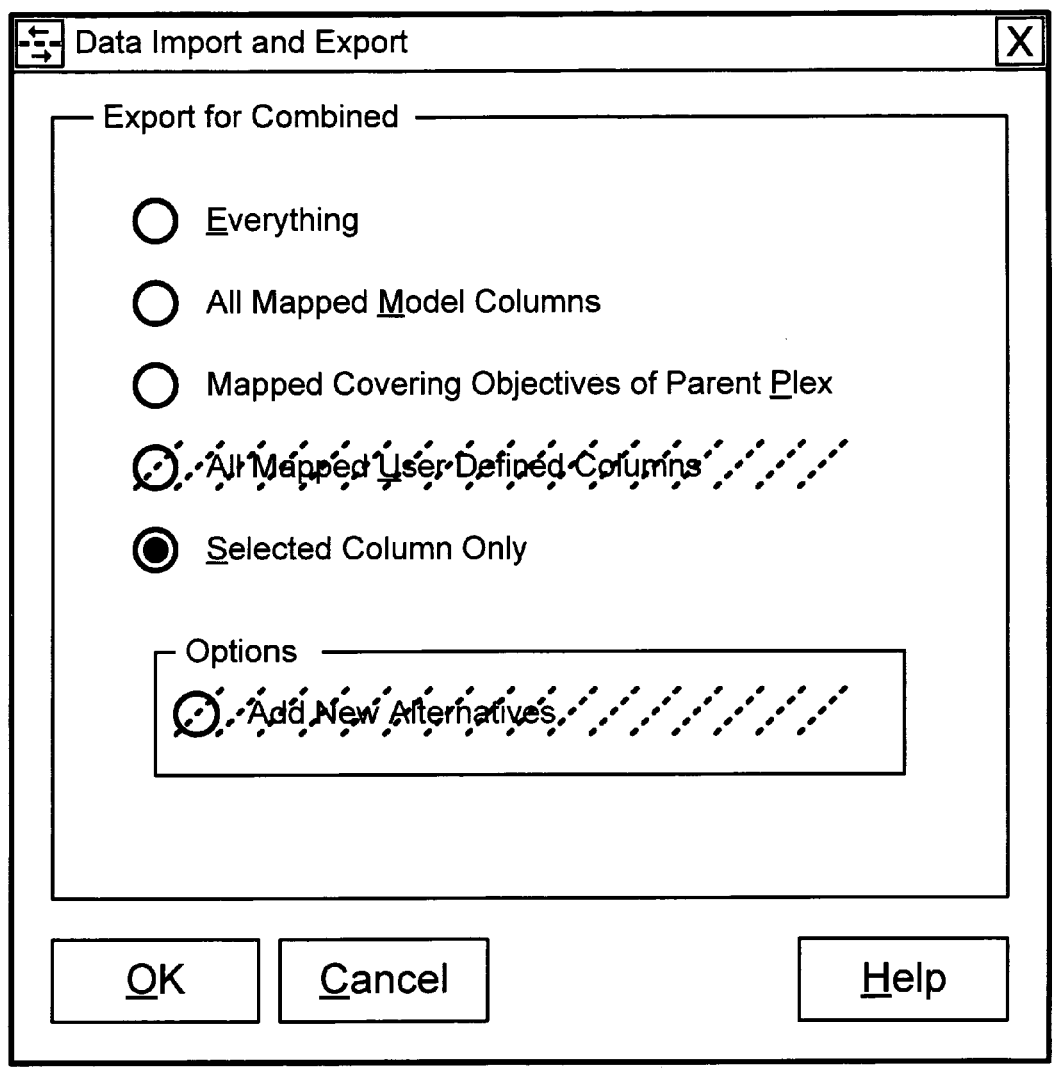
FIG. 3 shows an example screenshot of a data import and export form as per an embodiment of an aspect of the present invention.
Figure 4:
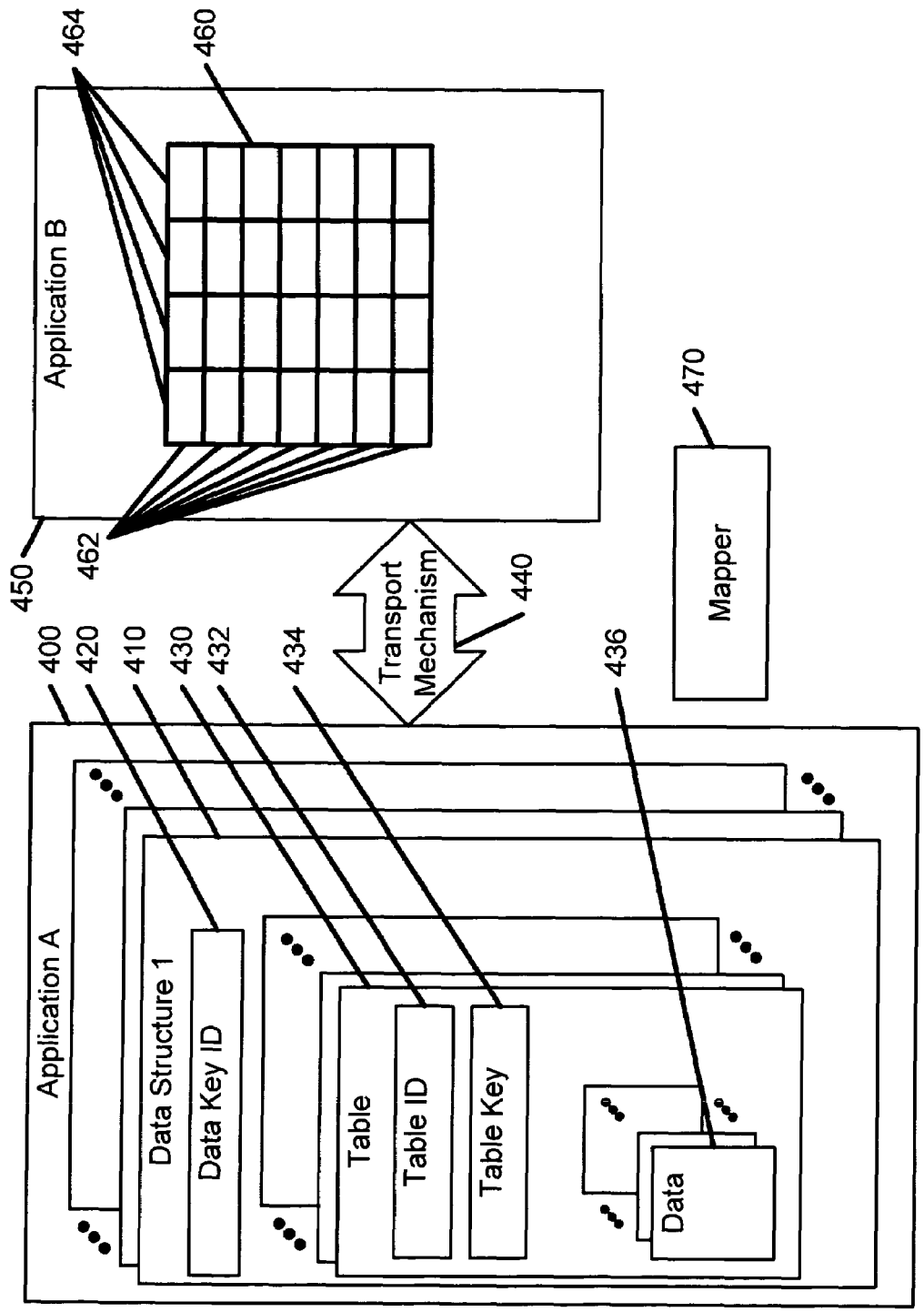
FIG. 4 shows a flow diagram of data mapping between the two applications as per an embodiment of an aspect of the present invention.

Data may be exported/imported to/from an external database in this embodiment using the following steps:

1. Make sure the desired export/import columns are mapped.
2. From the Data Grid, determine what instance is to be exported/imported from/to; and make it the current instance.
3. Determine what fields are to be exported/imported and then select one of the following options: (see FIG. 3).
    Everything (exports/imports all mapped columns in the Data Grid).
    All mapped Model Columns (exports/imports all mapped covering objectives in the model).

Mapped Covering Objectives of Parent Plex (exports/imports all mapped covering objectives of a Plex).

All Mapped User Defined Columns (exports/imports all mapped user defined columns).

Selected Column Only (exports/imports the current mapped column; you must select the desired column first).

Add New Alternatives (imports new alternatives from the external database).

One can import data to the current instance in the Data Grid (when the program is being utilized by multiple users). This may be the facilitator, a specific participant or a combined instance. It is recommended to import to the facilitator instance or participant instance because importing to the Combined instance may result in a future overwrite of data if and when the Combined instance is recombined.

Importing to an existing subset of alternatives from an external database may require entries in the Map Key column in the Data Grid to associate the records in the external database with specific alternatives in the Data Grid. If there is no matching key in the Map Key column of the Data Grid, then the records may either be ignored, or added as new alternatives in the Data Grid, depending on whether or not the Add New Alternatives check box is selected as an option when importing. The following scenarios are illustrative of different situations that may arise when importing data from an external database.

Data may be imported to an external database in this embodiment using multiple scenarios. Import Scenario I (Importing Alternatives into a New Model from an External Database) may be performed using the following steps:
1. Construct a new model, entering objectives and sub-objectives, but no alternatives.
2. From the Data Grid, define a mapping for the Alternative column to an external database table that contains a field for alternative names, and a field for a map key designator for each alternative.
3. From the Data Grid, select Mapping I Import Data for, (or right-click the bridge button in the Alternative column header).
4. Verify that the Add New Alternatives checkbox is checked.
5. Select OK. (At this point alternatives and Map Key designators may be added to the Data Grid in their respective columns).

Import Scenario II (Importing Additional Alternatives from an External Database) may be performed by starting with a model containing objectives, sub-objectives and alternatives, and then following the steps from Scenario I above. New alternatives and their key designators may be added to the existing set of alternatives in the Data Grid.

Import Scenario III (Importing Data for Existing Alternatives from an External Database) may be performed using the following steps:
1. Starting with a model containing objectives, sub-objectives and alternatives, create a data mapping for a covering objective or user defined column to which data is to be imported from an external database. If a map key does not exist for any of the alternatives for which external data is to be imported, type the map key value in the map key column of the Data Grid.
2. From the Data Grid, select Mapping I Import Data for, (or right-click the bridge button in the covering objective or user defined column header).
3. Verify that the Add New Alternatives checkbox is NOT checked. (Removing the check, will only import records into the Data Grid that already contain map keys. If you fail to do this, then records in the external database for which no corresponding map key exists in Expert Choice may be added as new alternatives in the Data Grid.)
4. Select OK.

Import Scenario IV (Importing Data for More than one Covering Objectives and/or User Defined) may be performed using the following steps:
1. Follow the steps 1-3 in Scenario III above and then select one of the Data Import Options below (see FIG. 3).
   Everything (imports all mapped columns in the Data Grid).
   All mapped Model Columns (imports all mapped covering objectives in the model).
   Mapped Covering Objectives of Parent Plex (imports all mapped covering objectives of a Plex).
   All Mapped User Defined Columns (imports all mapped user defined columns).
   Selected Column Only (imports the current mapped column; one must select the desired column first).
2. Select OK.

Import Scenario V (Special Case—Importing Only Some New Alternatives from an External Database) may be performed using the following steps:
1. Identify those new alternatives to be added to Expert Choice and from the Data Grid add a temporary name for each alternative such as A, B, C.
2. In each Map Key Column, add each alternatives' Map Key.
3. Select Mapping I Import Data for, (or right-click the bridge button in the Alternative column header).
4. Verify that the Add New Alternatives checkbox is NOT checked. (Removing the check, will only import records into the Data Grid that already contain map keys. If one fails to do this, then records in the external database for which no corresponding map key exists in Expert Choice may be added as new alternatives in the Data Grid.)
5. Select OK (and the alternative names associated with the map ids will be imported).

The present invention includes a method for the bilateral transfer of data between a first application and a second application. This transfer includes the steps of: mapping data between the first application and the second application; and transporting data between the first application and the second application.

The first application 400 may include at least one data structure 410. The data structure(s) 410 may include the following: a data structure identifier 420 and at least one table 430. The table 430 preferably includes: a table identifier 432, a table key field 434; and at least one table data field 436. Data may be stored in at least one of the table data field(s) 436.

The second application 450 may include: a data grid 460. The data grid 460 may include at least one column 464 and at least one row 462. Each of the column(s) 464 preferably include at least one cell and one column formula.

Figure 5:
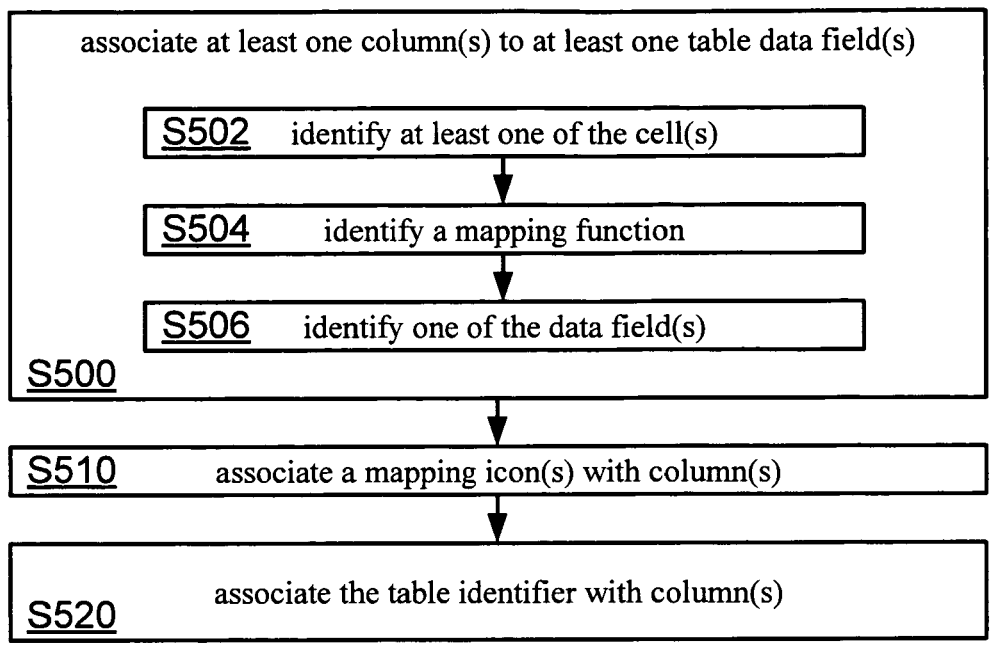
FIG. 5 shows a flow diagram of transporting data between the application(s) as per an embodiment of an aspect of the present invention.

The mapping of data between the first application and the second application may be performed by a mapper 470 using steps such as those shown in FIG. 5. This mapping preferably includes the steps of: associating at least one of the column(s) to at least one of the table data field(s) (Step S500); associating a mapping icon with each of these column(s) (Step S510); and associating the table identifier with each of these column(s) (Step S520). The step of associating at least one of the column(s) to at least one of the table data field(s) (Step S500) may further include the steps of: identifying at least one of the cell(s) (Step S502); identifying a mapping function (Step S504); and identifying one of the data field(s) (Step S506). FIG. 1 shows one way of identifying a data field as per this embodiment of the invention. As shown, different variables may be used to make this selection such as table identifiers, data structure identifiers, field names, and key field names.

A method may also be provided that facilitates the copying and editing of mappings from one column to one or more other columns.

Figure 6:
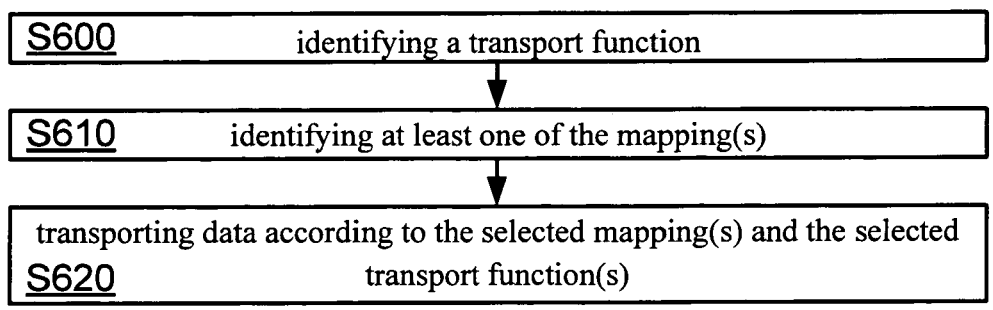
FIG. 6 shows another flow diagram of transporting data between applications as per an embodiment of an aspect of the present invention.

Steps for transporting data between the first application and the second application are shown in FIG. 6. These steps include: identifying a transport function (Step S600); identifying at least one of the mapping(s) (Step S610); and transporting data according to the selected mapping(s) and the selected transport function(s) (Step S620). Transport functions may include import functions, export functions, processing functions. Processing functions may enable processes such as data acquisition, data calculations, etc.

It is envisioned that exceptions may be made on either an as needed or more globally identified basis. For example, if elements do not exist, the system may inform the user of the problem and provide an alternative option. During transport stages, exceptions may be needed to handle cases such as empty or null identifying fields. Additionally, validity or sanity checks performed and appropriate alternative actions taken (and created) based upon the check results. Additionally, error conditions may need to respond to unexpected behaviors. In some cases these errors may be caused because of changes within one of the applications.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated. For example, one skilled in the art will recognize that the present invention may be used to transfer data between other applications such as between two general or two specific applications. Similarly, although the present application indicated example database programs that could be used included SQL Server and Access, one skilled in the art will recognize that other applications such as that the other applications such as Oracle, MS Excel or MS Project may be used.

What is claimed is:

1. A tangible computer-readable medium encoded with a computer program, wherein execution of said computer program by one or more processors causes said one or more processors to bilaterally transfer data comprising the steps of:
   a) mapping data between a first application and a second application,
      i) said first application including at least one data structure, each of said at least one data structure including:
         (1) a data structure identifier; and
         (2) at least one table, each of said at least one table including:
            (a) a table key field;
            (b) a table identifier; and
            (c) at least one table data field configured to store data;
      ii) said second application including a data grid, said data grid including:
         (1) at least one column, at least one of said at least one column including:
            (a) at least one cell; and
            (b) a column formula; and
         (2) at least one row;
      iii) said mapping data between said first application and said second application including the steps of:
         (1) associating at least one of said at least one column to at least one of said at least one table data field by:
            (a) identifying at least one of said at least one cell;
            (b) identifying a mapping function;
            (c) identifying one of said at least one data field;
         (2) associating a mapping icon with the just associated said at least one column and
         (3) associating said table identifier with the just associated said at least one column and
   b) transporting data between said first application and said application by:
      i) identifying a transport function;
      ii) identifying at least one of said at least one mapping; and
      iii) transporting data according to the selected said at least one mapping and the selected said transport function.

2. The tangible computer-readable medium according to claim 1, wherein at least said first application or said second application is a decision support application.

3. The tangible computer-readable medium according to claim 1, wherein at least said first application or said second application implements~Analytical Hierarchy Process principals.

4. The tangible computer-readable medium according to claim 1, further including copying and editing mappings from one column to one or more other columns.

5. A bilateral data transfer apparatus having a memory for storing instructions from tangible computer-readable mediums, and having one or more processors for executing said instructions, comprising: a) tangible computer-readable medium containing a first application, said first application including: i) at least one data structure, at least one of said at least one data structure including: (1) a data structure identifier; and (2) at least one table, said at least one table including: (a) a table key field; (b) a table identifier; and (c) at least one table data field; and b) a tangible computer-readable medium containing a second application, said second application including: i) a data grid, said data grid including: (1) at least one column, at least one of said at least one column including: (a) at least one cell; and (b) a column formula; and (2) rows; ii) a mapper, said mapper capable of creating at least one mapping, at least one of said at least one mapping created by: (1) associating at least one of said at least one column to at least one of said at least one table data field by: (a) identifying at least one of said at least one cell; (b) identifying a mapping function; and (c) identifying one of said at least one data field; (2) associating a mapping icon with the just associated said at least one column; and (3) associating said table identifier with the just associated said at least one column; and iii) a transport mechanism, said transfer transport mechanism configured for: (1) identifying a transport function; (2) identifying at least one of said at least one mapping; and (3) transporting data according to the selected said at least one mapping and the selected said transport function.

6. The apparatus according to claim 5, wherein said mapper is configured to copy and edit mappings from one column to one or more other columns.

* * * * *